United States Patent [19]

Panten et al.

[11] Patent Number: 4,962,643
[45] Date of Patent: Oct. 16, 1990

[54] SOOT-PARTICLE FILTER ARRANGEMENT FOR THE EXHAUST-LINE SYSTEM OF AN INTERNAL-COMBUSTION ENGINE

[75] Inventors: Detlef Panten, Korb; Jürgen Jegelka, Aichwald; Roland Schubert, Overath, all of Fed. Rep. of Germany

[73] Assignee: Daimler-Benz AG, Stuttgart, Fed. Rep. of Germany

[21] Appl. No.: 350,405

[22] Filed: May 11, 1989

[30] Foreign Application Priority Data

May 11, 1988 [DE] Fed. Rep. of Germany ....... 3816233

[51] Int. Cl.$^5$ ............................................... F01N 3/02
[52] U.S. Cl. ........................................ 60/288; 60/311
[58] Field of Search ......................... 60/288, 274, 311

[56]     References Cited
     FOREIGN PATENT DOCUMENTS 3235953 3/1984 Fed. Rep. of Germany ........ 60/275
2538449 6/1984 France ................................... 60/288

Primary Examiner—Douglas Hart
Attorney, Agent, or Firm—Evenson, Wands, Edwards, Lenahan & McKeown

[57] ABSTRACT

The invention relates to a soot-particle filter which is arranged in the exhaust-line system of an internal-combustion engine and which can be bypassed by means of a bypass line closable under full load. So that the vehicle can accelerate smoothly out of low speed ranges under full-load conditions, even when the filter is clogged, the bypass line is opened only when the speed of the internal-combustion engine is below a first speed limit value during its warm-up phase, when the speed of the internal-combustion engine is below a second speed limit value under hot-running conditions, and when, with the soot-particle filter clogged, the internal-combustion engine load is simultaneously below a predetermined load limit.

19 Claims, 2 Drawing Sheets

SOOT-PARTICLE FILTER ARRANGEMENT FOR THE EXHAUST-LINE SYSTEM OF AN INTERNAL-COMBUSTION ENGINE

BACKGROUND AND SUMMARY OF THE INVENTION

The invention relates to a soot-particle filter arranged in the exhaust-line system of an internal-combustion engine of the type having a bypass line guiding the exhaust-gas stream past the soot-particle filter and closable under the full load of the internal-combustion engine.

German Published Unexamined Patent Application (DOS) 3,235,953 makes known a soot-particle filter of the relevent generic type which is subjected to the exhaust gas only when the internal-combustion engine is operating under full load.

In contrast, in other load ranges, the exhaust gas laden with soot particles is guided past the filter through a bypass line and cleaned via a separate soot-particle separator device. A disadvantage of this arrangement is that, when the soot-particle filter is clogged, in those operating ranges in which the exhaust-gas temperatures necessary for the regeneration of the filter do not apply, the internal-combustion engine cannot be operated under full load during the start-up process and, in general, during acceleration out of low speed ranges, since because the bypass line is generally closed under full load there is a very rapid and sharp increase in the exhaust-gas back-pressure and consequently, under certain circumstances, the internal-combustion engine stops.

If the filter is not blocked completely, although it is unlikely that the internal-combustion engine will stop immediately, nevertheless, under full-load conditions, a stationary state is established even in the lowest speed ranges, with such an excessively high exhaust-gas back-pressure that the quantity of fuel injected is converted into soot particles to an increased extent because of a corresponding lack of air and an impaired mixture formation, and therefore the time elapsing until the soot-particle filter is clogged completely is only very short.

An object on which the invention is based is, therefore, to develop further a soot-particle filter arrangement in the exhaust-line system of an internal-combustion engine of the type described above, in such a way that, when the filter is almost or completely clogged, a start-up or an acceleration out of low speed ranges is generally possible under full-load conditions, that is to say even when the exhaust-gas temperature is of a value insufficient for the regeneration of the filter.

According to preferred embodiments of the invention, this object is achieved by an arrangement wherein the bypass line is opened only when (i) the speed of the internal-combustion engine is below a first speed limit value during its warm-up phase, (ii) the speed of the internal-combustion engine is below a second speed limit value under hot-running conditions, and, (iii) with the soot-particle filter laden, the internal-combustion engine load is simultaneously below a predetermined load limit.

Since the bypass line is opened in the lower speed ranges during the warm-up phase, and also when the internal-combustion engine is already running hot, there is no possibility of a critical increase in the exhaust-gas back-pressure, thus ensuring an easy and smooth start-up and acceleration in these ranges, even under full-load conditions. At higher internal-combustion engine speeds, the soot-particle filter is subject to charging when it is still sufficiently capable of receiving soot particles, that is to say when a predetermined limiting exhaust-gas back-pressure has not yet been reached. At an exhaust-gas pressure which is above this limiting value, the soot filter is charged only when there is a guarantee that the exhaust gas is at a temperature sufficient for the regeneration of the filter, that is to say above a predetermined load limit value. It is therefore impossible, in any operating state, for the internal-combustion engine to stop as a result of a blocked filter. Even starting the internal-combustion engine with the soot filter completely clogged presents no difficulties of any kind.

Other objects, advantages and novel features of the present invention will become apparent from the following detailed description of the invention when considered in conjunction with the accompanying drawings.

DETAILED DESCRIPTION OF THE DRAWINGS

Figure 1:
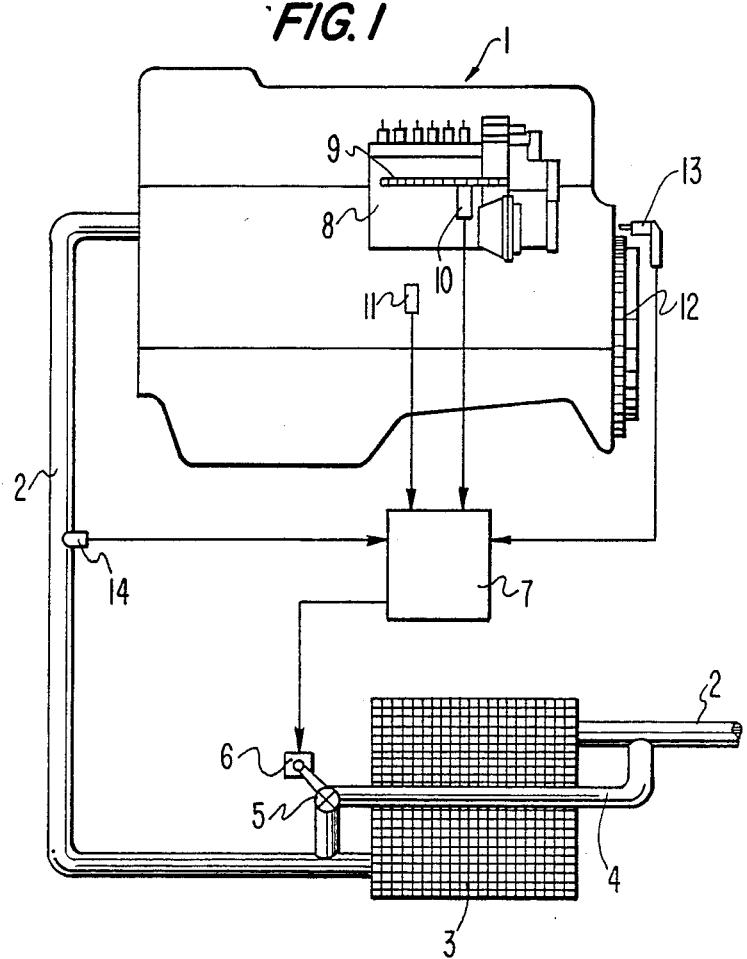
FIG. 1 shows a basic representation of a soot-particle filter arrangement constructed according to a preferred embodiment of the invention.
Figure 1A:
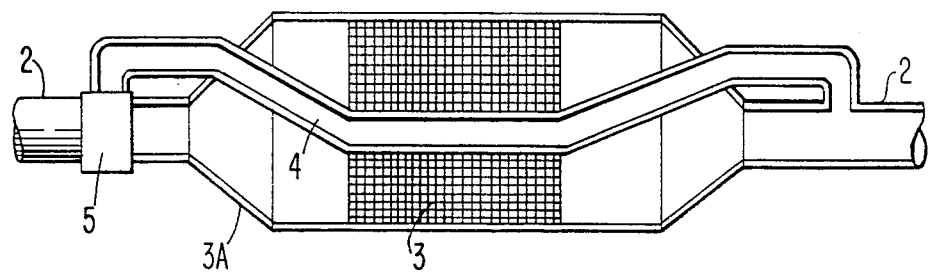
FIG. 1A is an enlarged schematic view depicting a preferred embodiment of the soot particle filter and bypass arrangement.

FIG. 1 illustrates a Diesel internal-combustion engine 1, in the exhaust line 2 of which a soot-particle filter 3 is arranged. Upstream of the filter 3, a bypass line 4 branches off from the exhaust line 2 and extends in bypassing relationship through the filter 3 and enters the exhaust line 2 again downstream of the filter 3. FIG. 1A schematically depicts the extension of the bypass line 4 through a filter 3 disposed in a filter casing 3A which form an effective expanded section of the exhaust line. Inserted in the bypass line 4 itself is a valve 5, by means of which its line cross-section can be closed or opened. This valve 5 is actuated via an actuating drive 6 which itself is controllable by a set-value signal generated by an electronic control unit 7.

The control unit 7 generates the set-value signal as a function of (i) a signal correpsonding to the current internal-combustion engine load, (ii) a signal corresponding to the current internal-combustion engine temperature, (iii) a signal corresponding to the current internal-combustion engine speed and (iv) a signal corresponding to the current exhaust-gas back-pressure. For this arrangement, the load is determined via a sensor 10 detecting the deflection $x_{RS}$ of the control rod 9 arranged on the injection pump 8 of the internal-combustion engine 1, the temperature is determined via a sensor 11 detecting the coolant temperature T of the internal-combustion engine 1, the engine speed n is determined via a sensor 13 sensing the rotation of the flywheel 12 and the exhaust-gas back-pressure p is determined via a sensor 14 arranged in the exhaust line 2 upstream of the filter 3.

Figure 2:
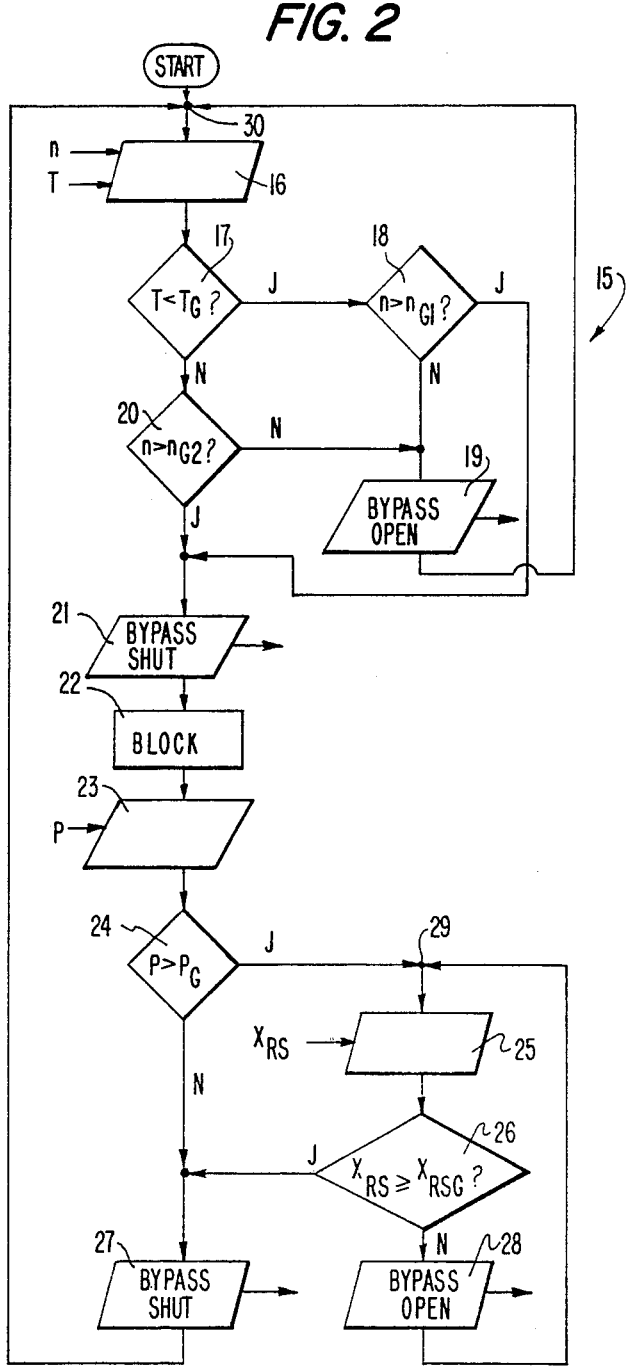
FIG. 2 is a schematic flow diagram depicting the mode of operation of the control unit designated by 7 in FIG. 1.

FIG. 2 shows a flow diagram 15 of the mode of operation of the electronic control unit designated by 7 in FIG. 1. After the internal-combustion engine 1 has been started, the current values for the internal-combustion engine speed n and for the internal-combustion engine temperature T are first entered in the input block 16. Then, a check is subsequently made in the branching block 17 as to whether the current internal-combustion engine temperature T is still below a predetermined limit value $T_G$. If affirmative, the control branches to the next branching block 18 which inquires whether the engine speed n has already exceeded a first speed limit value $n_{G1}$ or not. If this has not yet occurred, the actuating drive 6 (FIG. 1) is controlled via the output block 19 in such a way that the bypass line 4 is opened. If the warm-up phase of the internal-combustion engine 1 has already ended, that is to say the current internal-combustion engine temperature T is higher than or equal to the limit value $T_G$ (branching block 17), the branching block 20 inquires whether the current engine speed n has already exceeded a second speed limit value $n_{G2}$. If the engine speed n is equal to the limit value $n_{G2}$ or is still below it, an opening of the bypass line 4 is likewise obtained via the output block 19. If the first limit speed $n_{G1}$ has already been reached or exceeded when the internal-combustion engine is not yet running hot or the second limit speed $n_{G2}$ has already been reached or exceeded when the internal-combustion engine is running hot, the actuating drive 6 is controlled via the output block 21 in such a way that the bypass line 4 is closed, that is to say the exhaust-gas stream now flows via the soot-particle filter 3, so that, after a reasonable interval (block 22), the exhaust-gas back-pressure p prevailing upstream of the filter 3 in the exhaust line 2 and consequently the degree of clogging of the filter 3 can be measured or transferred to the control unit 7 (input block 23). The interval between the control of the actuating drive 6 and the measurement of the exhaust-gas back-pressure p is provided so as to prevent the measurement of the exhaust-gas back-pressure p from being falsified because the bypass line 4 may possibly not yet be closed completely.

In the ensuing branching block 24, the degree of clogging of the filter 3 is determined by checking whether the previously measure exhaust-gas back-pressure p is already higher than a limit pressure $p_G$ determined from a set of characteristrics as a function of the internal-combustion engine speed n. If this is the case, after the transfer of the current internal-combustion engine load $x_{RS}$ (input block 25), the branching block 26 inquires whether there is already an internal-combustion engine load $x_{RS}$ providing exhaust-gas temperatures which are sufficient for the best possible regeneration of the soot-particle filter 3. If so, that is to say if the current control-rod deflection $x_{RS}$ serving as a measure of the load is greater than or equal to a limit value $x_{RSG}$, the bypass line 4 remains closed (output block 27). The same is, of course, also true when the comparison between the current exhaust-gas back-pressure p and the limit pressure $p_G$ ( branching block 24) shows that the filter 3 is still sufficiently capable of receiving particles. However, if, when the filter 3 is clogged, the load $x_{RS}$ just run through is below the limit value $x_{RSG}$, below which there is no guarantee of a satisfactory regeneration of the filter 3 because of relatively low exhaust-gas temperatures, the bypass line 4 is opened via the output block 28, so that an inadmissibly high exhaust-gas back-pressure and therefore possibly a "choking" of the internal-combustion engine 1 can be prevented reliably. The bypass line 4 remains open until the inquiry in the branching block 26 confirms a sufficiently large control-rod deflection $x_{RS}$, that is to say a sufficient internal-combustion engine load. Until then, the control always branches back to the point 29 for a new input of the current load $x_{RS}$ (input block 25).

After the actuating drive 6 for the actuation of the valve 5 arranged in the bypass line 4 has been controlled via the output blocks 19 and 27, there is each time a return to the starting point 30 for a new input of the current parameters n and T (input block 16).

For this exemplary embodiment, the first speed limit value $n_{G1} = 2000$ min$^{-1}$(2000 revolutions per minute), the second speed limit value $n_{G2} = 1600$min$^{-1}$ (1600 revolutions per minute) and the coolant limit temperature $T_G = 80°$ C. It is also contemplated in certain embodiments to select the two speed limit values $n_{G1}$ and $n_{G2}$ equal to one another.

In a further embodiment of the invention, it is also contemplated, when the soot-particle filter is completely blocked, to open the bypass line generally and signal to the driver, via a pilot light installed in the vehicle dashboard, that he must contact a workshop.

Although the present invention has been described and illustrted in detail, it is to be clearly understood that the same is by way of illustration and example only, and is not to be taken by way of limitation. The spirit and scope of the present invention are to be limited only by the terms of the appended claims.

What is claimed:

1. Soot-particle filter arrangement in the exhaust-line system of an internal-combustion engine equipped with a bypass line guiding the exhaust-gas stream past a soot-particle filter;

valve means for opening and closing said bypass line;

control means responsive to engine speed, engine temperature, engine load and exhaust line conditions for operating the bypass valve means during full load operation of the internal-combustion engine;

said control means operating said bypass valve means to open said bypass line only when said control means indicates that:

(i) the speed of the internal-combustion engine is below a first speed limit value during engine warm-up phase, (ii) the speed of the internal-combustion engine is below a second speed limit value under hot-running engine conditions, and (iii) with the soot-particle filter laden and the internal-combustion engine load is simultaneously below a predetermined load limit.

2. Arrangement according to claim 1, wherein the first speed limit value is equal to the second speed limit value.

3. Arrangement according to claim 1, wherein the first speed limit value is higher than the second speed limit value.

4. Arrangement according to claim 1, wherein the first speed limit value is 2000 rpm.

5. Arrangement according to claim 2, wherein the first speed limit value is 2000 rpm.

6. Arrangement according to claim 3, wherein the first speed limit value is 2000 rpm.

7. Arrangement according to claim 1, wherein the second speed limit value is 1600 rpm.

8. Arrangement according to claim 2, wherein the second speed limit value is 1600 rpm.

9. Arrangement according to claim 6, wherein the second speed limit value is 1600 rpm.

10. Arrangement according to claim 1, wherein the valve means is arranged in the bypass line, which valve means is actuable by means of an actuating drive appropriately controllable from the control means as a function of engine load, engine speed, engine exhaust-gas back-pressure and engine temperature.

11. Arrangement according to claim 2, wherein the valve means is arranged in the bypass line, which valve means is actuable by means of an actuating drive appropriately controllable from the control means as a function of engine load, engine speed, engine exhaust-gas back-pressure and engine temperature.

12. Arrangement according to claim 3, wherein the valve means is arranged in the bypass line, which valve means is actuable by means of an actuating drive appropriately controllable from the control means as a function of engine load, engine speed, engine exhaust-gas back-pressure and engine temperature.

13. Arrangement according to claim 4, wherein the valve means is arranged in the bypass line, which valve means is actuable by means of an actuating drive appropriately controllable from the contol means as a function of engine load, engine speed, engine exhaust-gas back-pressure and engine temperature.

14. Arrangement according to claim 7, wherein the valve means is arranged in the bypass line, which valve means is actuable by means of an actuating drive appropriately controllable from the control means as a function of engine load, engine speed, engine exhaust-gas back-pressure and engine temperature.

15. Arrangement according to claim 9, wherein the valve means is arranged in the bypass line, which valve means is actuable by means of an actuating drive appropriately controllable from the control means as a function of engine load, engine speed, engine exhaust-gas back-pressure and engine temperature.

16. Arrangement according to claim 1, wherein the bypass line extends through the soot-particle filter.

17. Arrangement according to claim 2, wherein the bypass line extends through the soot-particle filter.

18. Arrangement according to claim 3, wherein the bypass line extends through the soot-particle filter.

19. Arrangement according to claim 10, wherein the bypass line extends through the soot-particle filter.

* * * * *